April 5, 1966 R. M. WORREL 3,243,946
ROTARY SIDE DELIVERY FORAGE HARVESTERS
Filed July 8, 1963 3 Sheets-Sheet 1
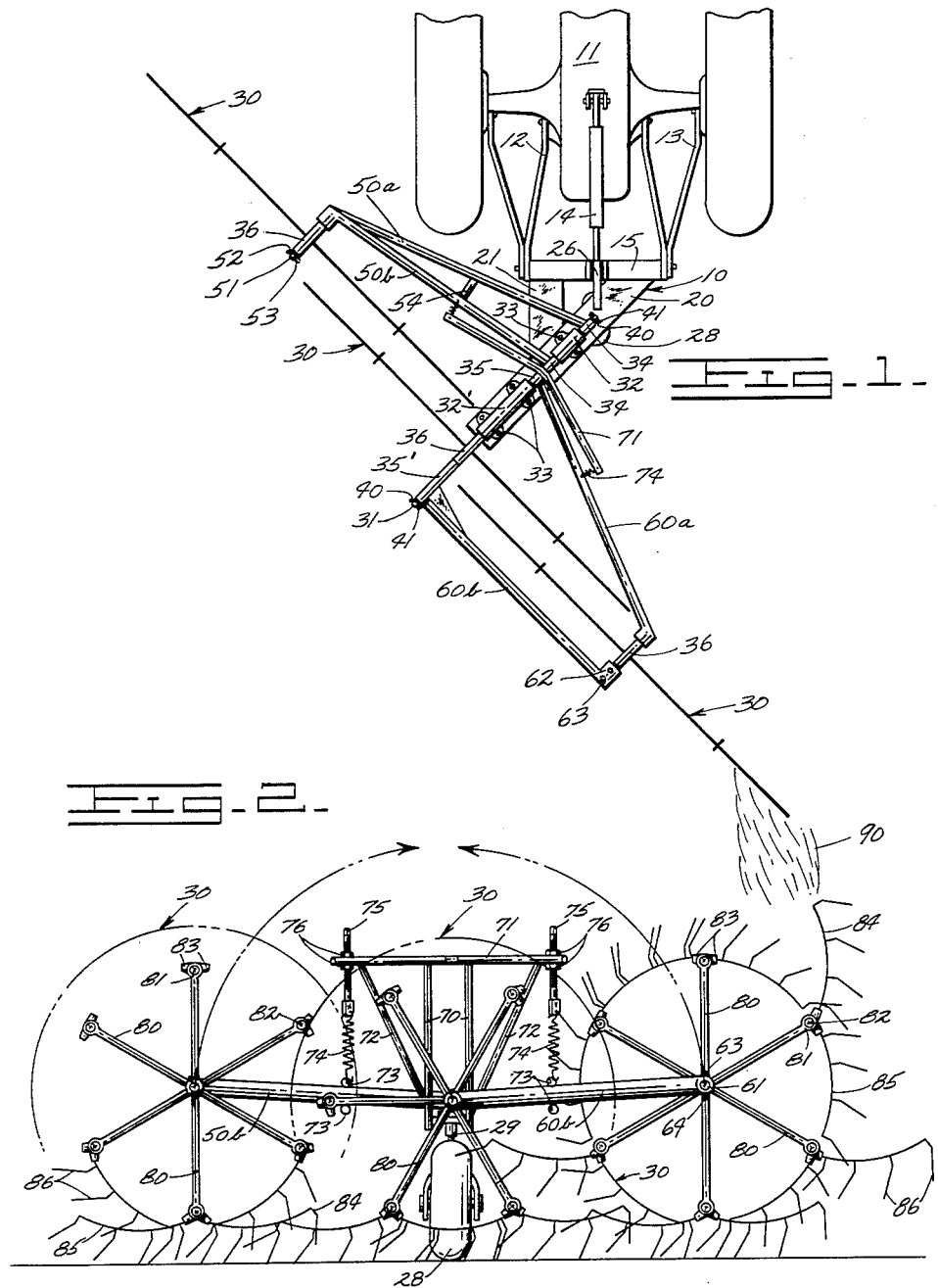
RICHARD M. WORREL
INVENTOR
Huebner + Worrel
ATTORNEYS

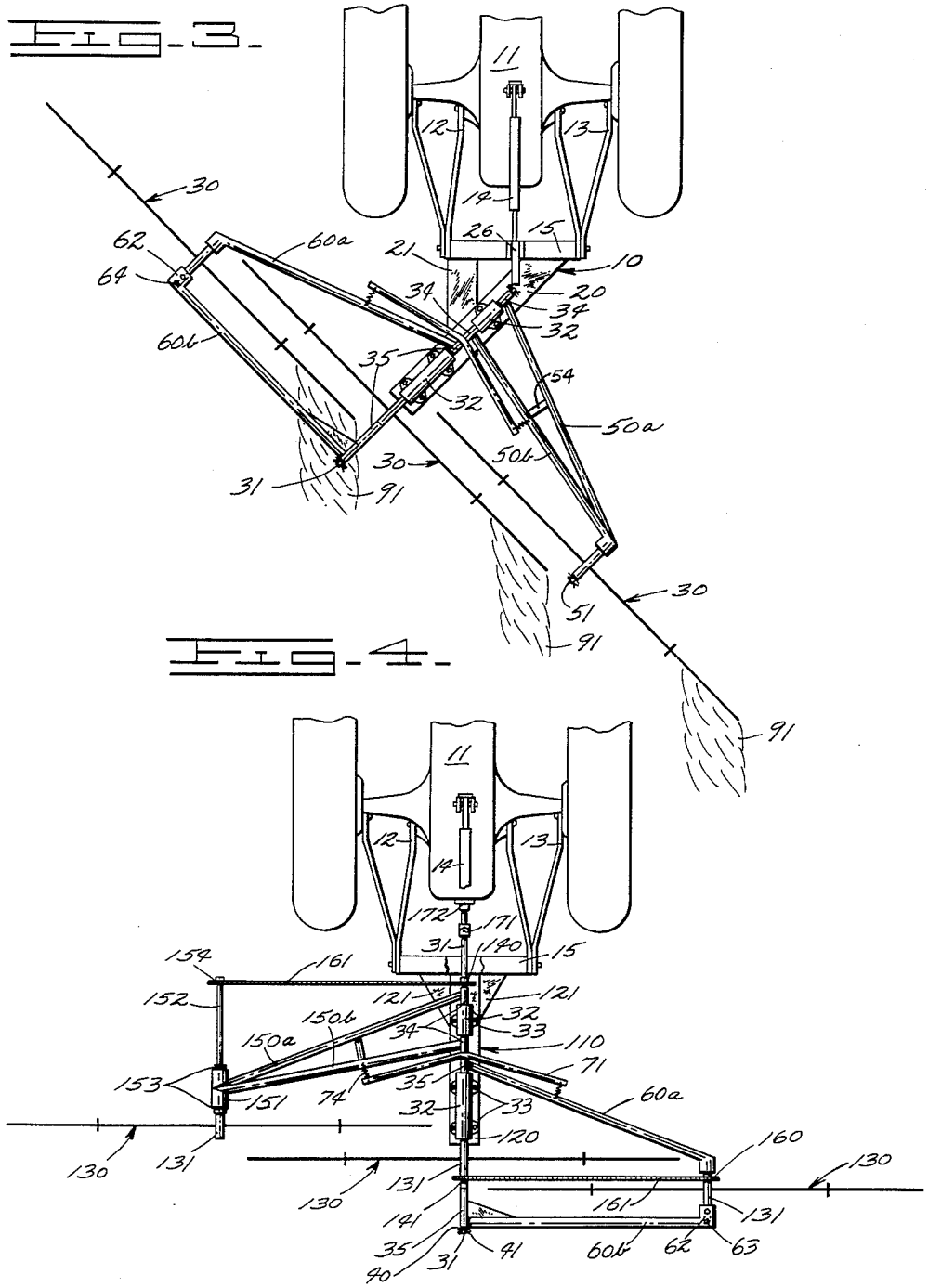

April 5, 1966  R. M. WORREL  3,243,946
ROTARY SIDE DELIVERY FORAGE HARVESTERS
Filed July 8, 1963  3 Sheets-Sheet 3
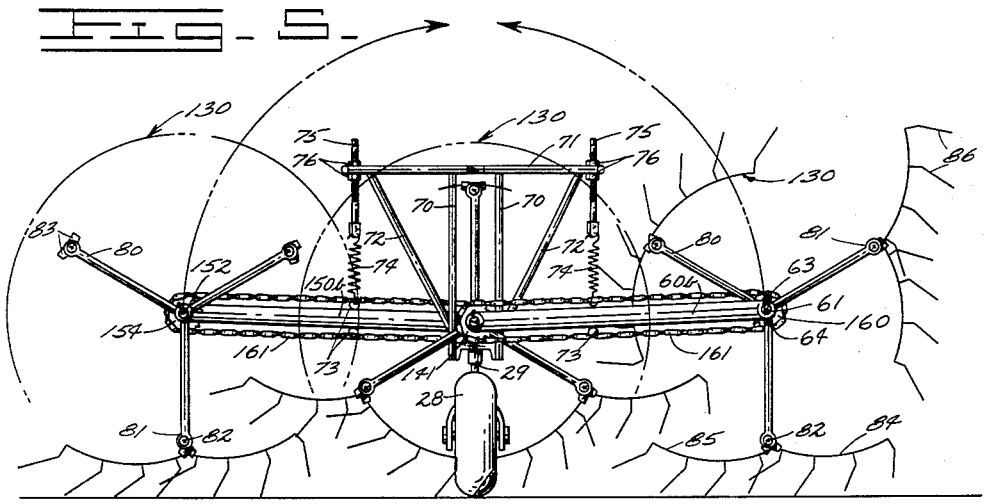
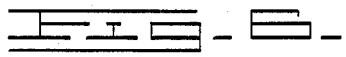
RICHARD M. WORREL
INVENTOR
*Huebner & Worrel*
ATTORNEYS United States Patent Office 3,243,946
Patented Apr. 5, 1966

3,243,946
ROTARY SIDE DELIVERY FORAGE
HARVESTERS
Richard M. Worrel, Fresno, Calif., assignor of one-half to
Herbert A. Huebner, Los Angeles, Calif.
Filed July 8, 1963, Ser. No. 293,468
14 Claims. (Cl. 56—377)

The present invention relates to rotary side delivery forage harvesters of the wheel type and more particularly to improved mechanism for the mounting and transport of the raking wheels thereof. In certain forms of the instant harvesters which are subsequently described, the invention contemplates alternate use as a rake and as a tedder without structural modification, such adaptation involving a novel co-action between the mounting mechanism and a raking wheel having separable peripheral segments; makes possible the precise synchronizing of raking wheel rotation even though the wheels are mounted for independent elevational movement in conforming to terrain traversed; enables ground driving of the raking wheels incident to resistance to travel offered by forage encountered by the raking wheels and power driving of the raking wheels from an independent source of power without interference with independent elevational movement of the raking wheels; and permits simple conversion between raking and tedding adjustments without in any way interfering with either type of raking wheel motivation.

The continual quest for simplification, reduction in weight, minimizing of cost, and improvement in operation of forage harvesters of the wheel type has led to successive refinements utilized on a wide scale thoughout the world. Recent improvements in the raking wheels, as described in my companion co-pending patent application concurrently executed herewith, have made possible the substantial enlargement of the raking swath attainable by a wheel of a given radius. As a result, substantial simplification of the mechanisms for mounting and transporting the raking wheels in forage harvesters has been made possible without unduly restricting the total raking swath achieved and further refinement of such harvesters facilitated.

An object of the present invention is, therefore, to provide a simplified mechanism for mounting and transporting rotary raking wheels in forage harvesters.

Another object is to enable a substantial reduction in the weight of forage harvesters.

Another object is to reduce the cost of production of forage harvesters of the wheel type.

Another object is to provide an improved forage harvester selectively operable as a rake and as a tedder without structural modification.

Another object is to provide a forage harvester having a plurality of peripherally overlapping raking wheels disposed in substantially erect parallel planes alternately positionable to convey forage successively from one to another into a common windrow for raking purposes and independently to discharge forage encountered thereby for tedding purposes.

Another object is to provide such a harvester in which the raking wheels are alternately positionable by selective pivoting of mounting arms utilized therein.

Another object is to provide a forage harvester of the character described in which the raking wheels may be ground driven or power driven.

Another object is to provide a forage harvester which can be disassembled and reassembled with a minimum of effort as for repair, storage, or transport in compact condition.

Further objects and advantages will become apparent in the subsequent description in the specification.

In the drawings:

FIG. 1 is a top plan view of a forage harvester of the present invention coupled to a draft appliance which is fragmentarily represented, said harvester being shown in raking adjustment.

FIG. 2 is a rear elevation of the forage harvester of FIG. 1 viewed axially of the raking wheels thereof.

FIG. 3 is a view similar to FIG. 1 but with the harvester adjusted for tedding operations.

FIG. 4 is a top plan view of a second form of forage harvester of the present invention coupled to a draft appliance which is likewise fragmentarily represented, said harvester being shown in raking adjustment.

FIG. 5 is a rear elevation of the forage harvester of FIG. 4 viewed axially of the raking wheels and in the direction of normal earth traversing movement.

FIG. 6 is a view similar to FIG. 4 but showing the harvester in tedding adjustment.

FIRST FORM

Referring in greater particularity to the drawings:

In FIGS. 1 through 3, a frame 10 is shown coupled to a tractor 11. The tractor provides a pair of rearwardly extended power-actuated lift arms 12, a pair of drift arms 13, of the well-known form adapted to resist side sway of the lift arms, and a draft control link 14. An A-frame 15 is mounted on the rearwardly extended ends of the lift arms 12 and the draft control link 14. As is well known in tractors of the type illustrated, hydraulic systems having operator controls, not shown, are provided whereby the lift arms 12 can be manipulated to raise and to lower the A-frame 15, as desired. In other adjustment, the system is conditioned so that the A-frame floats on the tractor at such elevations as any implement connected thereto may cause, and in further adjustment the system operates automatically to raise and to lower the A-frame in response to variations in resistance to forward movement imposed thereon which causes a forward thrust on the link 14.

The frame 10 consists of a beam 20 welded to the right side of the A-frame 15 and rearwardly substantially horizontally extended at approximately 45° angular relation to the direction of travel of the tractor 11. A brace 21 is welded to the opposite side of the A-frame and rearwardly extended for intersection with the beam 20 to which it is welded in triangular assembly with the A-frame. To aid in support of the frame and elements borne thereby, a tension link 26 preferably interconnects the beam 20 and the top of the A-frame 15.

A swivel gauge wheel 28 is preferably mounted beneath the frame 10 in a vertical mounting 29 and serves to limit the extent to which the frame can be lowered with respect to the ground so as to protect the raking wheels to which reference is now made.

The frame 10 mounts three raking wheels 30 for independent free rotation in substantially erect parallel planes obliquely related to the direction of travel of the tractor 11. For purposes of simplicity, economy and other advantages, the wheels are mounted on a single shaft 31 of high stress steel or the like mounted in a plurality of pillow blocks 32 and 32' rigidly secured in longitudinal alignment on the beam 20, as by bolts 33.

A pair of forward bearings 34 are mounted on the shaft on opposite sides of the forward pillow block 32. A pair of rearward bearings 35 and 35' are mounted on the shaft with one thereof rearwardly adjacent to the rearwardmost of the forward bearings 34 and the other thereof adjacent to the rearward end portion of the shaft 31. A central raking wheel 30 having a hub 36 is journaled on the shaft between the rearwardmost pillow block 32 and the rearwardmost of the rearward bearings 35'.

The shaft 31 is mounted in a substantially horizontal position oblique to the normal direction of movement of the tractor and the forwardmost of the forward bearings 34, the forwardmost of the pillow blocks 32, the rearwardmost of the forward bearings 34, the forwardmost of the rearward bearings 35, the rearwardmost of the pillow blocks 32, the hub 36 of the central raking wheel 30, and the rearwardmost of the rearward bearings 35' are located on the shaft 31 in axially abutting sequence. Opposite ends of the shaft 31 are provided with stop collars 40 and pins 41 are extended through the shaft in endward adjacent abutting relation to the collars to hold the designated elements on the shaft.

A pair of forward arms 50a and 50b are individually welded to the forward bearings 34 and laterally obliquely forwardly extended from the shaft 31 in convergent relation. The outer ends of the arms are weldably or otherwise rigidly interconnected and provide an axle 51 rearwardly extended therefrom in parallel relation to the shaft. A forward raking wheel 30 is journaled on the axle 51 and secured in position by a collar 52 and pin 53 extended through the axle in rearward abutting relation to the collar. For increased rigidity, a strut 54 preferably interconnects the arms intermediate their inner and outer end portions.

A pair of rearward arms 60a and 60b are individually welded to the rearward bearings 35 and 35' and laterally obliquely rearwardly extended from the shaft 31 in outward convergent relation. An axle 61 is rigidly mounted on the outer end of the forwardmost arm 60a and rearwardly extended in substantially parallel relation to the shaft 31. A rearward raking wheel 30 is journaled on the axle 61. The extended end of the rearwardmost arm 60b is provided with a sleeve 62 slidably fitted to the axle 61 and a pair of bolts 63 are extended through the sleeve and the axle therein and secured by nuts 64 screw-threaded thereon.

A spring supporting superstructure is optionally utilized including a pair of upright standards 70 rigidly mounted on opposite sides of the beam 20 adjacent to the abutment of the rearwardmost of the forward bearings 34 and the forwardmost of the rearward bearings 35. The standards are interconnected in parallel relation by a supporting arm 71 welded to the upper ends of the standards and oppositely extended substantially horizontally from the beam. The extended ends of the supporting arm are angled rearwardly of the shaft so as to permit the pivoting of the forward arms 50a and 50b and the rearward arms 60a and 60b therepast without interference. Struts 72 are preferably welded to the beam 20, upwardly divergently extended and welded to the outer ends of the supporting arm 71 in supporting relation thereto. Bales 73 are welded above and below the rearwardmost forward arms 50b and above and below the forwardmost rearward arm 60a beneath the extended ends of the supporting arm 71. Tension springs 74 are releasably connected to the upwardly disposed bales and provide bolts 75 upwardly slidably extended through the opposite ends of the supporting arms 71 and having adjusting nuts 76 screw-threadably mounted thereon above and below said arm. It will be evident that by adjusting the nuts 76 upwardly and downwardly on their respective bolts 75, the springs 74 may be tensioned or relieved as desired to provide resilient support for their respective forward arms 50a and 50b, rearward arms 60a and 60b, and raking wheels 30 borne thereby.

The raking wheels 30 are of a form described in detail in my companion patent application referred to above. Suffice it to note that each of the hubs 36 mounts six radial spokes 80 of equal length. Integral with the outer end of each spoke is a mounting yoke 81. Pivot pins 82 are extended through the yokes in substantially equally spaced parallel relation to their respective hubs. A pair of mounting blocks 83 are journaled on each of the pins 82, one thereof mounts a circumferentially extended leading raking segment 84 and the other mounts an oppositely circumferentially extended trailing raking segment 85. Each of the leading segments provided a plurality of resilient fingers 86 disposed substantially in a common plane normal to the hub of their wheel and each of the trailing segments provides a pluralty of fingers 86 similarly disposed in a substantially parallel plane. So mounted, the segments are pivotal between predetermined inner and outer positions. Engagement of the blocks 83 with their respective yokes 81 limit inward pivotal movement of the segments 84 and 85 to positions substantially concentric to their respective wheel. Lost motion means, not shown, are provided between the blocks on each pin so that as the wheels rotate in rolling action over the ground, the trailing segments 85 in approaching the ground gravitate outwardly and the lost motion means tucks their respective leading segments 84 inwardly. The lost motion means also serves to limit such outward movement of the trailing segments so that they descend to earth engagement in substantial tangential relation thereto. As the wheels roll over their respective trailing segments 85, such segments are urged into their inner positions and the lost motion means permits outward pivotal movement of their respective leading segments so that they leave the ground in substantial tangential relation thereto.

OPERATION OF FIRST FORM

The operation of the first form of the present invention is believed to be readily apparent and is briefly summarized at this point. With the harvester in the adjustment shown in FIG. 1, the tractor 11 is driven over an area to be raked. As the raking wheels 30 roll over the ground, they engage forage disposed thereon and deliver the forage successively from wheel to wheel into a common windrow 90. The sucessive inward and outward pivoting of the segments 84 and 85 provide a substantially increased swath for each wheel so that three raking wheels having effective rim diameters of four feet and disposed at approximately 45° relative to the line of travel provide a combined raking swath of between 8 and 9 feet, exceeding the swath of five conventional raking wheels of the same diameter.

Proper adjustment of the nuts 76 on the bolts 75 achieves as light a ground engagement by the forward and rearward wheels 30 as desired. The swivel wheel 28 supports the central wheel 30 so that it lightly engages the ground. It will be evident that when the segments 84 and 85 are pivoted outwardly from their innermost positions, they engage the ground with a force dependent upon their own weight.

When it is desired to convert the harvester of FIG. 1 from raking operations to tedding operations, the springs 74, if employed, are disconnected from their respective bales 73, and the forward arms 50a and 50b rearwardly pivoted approximately 180° and the rearward arms 60a and 60b forwardly pivoted substantially 180°. The springs are then reconnected to the bales of the arms then located therebelow. However, it will be noted that during opposite pivoting of the arms, the forwardmost arm 60a interferes with the raking wheel 30 mounted on the forward arms 50a and 50b. When such interference is about to occur, the trailing segment 85 of one spoke of the wheel and the leading segment 84 of an adjacent spoke of the wheel are manually pivoted to their outer positions. This provides a gap in the periphery of the wheel through which the forwardmost rearward arm 60a is permitted to pass. When the arms and their respective raking wheels are repositioned, as shown in FIG. 3, the segments are released for their described automatic gravitational operation.

As the harvester adjusted for tedding traverses the ground, each of the raking wheels 30 engages forage disposed thereon but instead of passing the forage successively from wheel to wheel, each wheel discharges its forage into a separate windrow 91. The windrows 91 are small and conductive to rapid drying of the forage. If they require turning, the harvester adjusted for tedding is drawn along the windrows 91 and they are rolled or unrolled as desired for drying convenience.

SECOND FORM

The second form of the present invention is shown in FIGS. 4 through 6 in which similar elements are given the same identifying numerals as in FIGS. 1 through 3.

The frame 110 differs from the frame 10 in that it mounts a beam 120 rigidly on the A-frame 15 centrally and in alignment with the direction of movement of the tractor. Braces 121 diagonally interconnect the beam and the A-frame in rigid assembly. As subsequently described, the second form of harvester mounts a plurality of rotary raking wheels 130 having hubs 131. Although any other suitable type of wheel, such as that shown in the first form, can be utilized.

As before, a shaft 31 is mounted on the beam 120 by means of spaced pillow blocks 32 and 32'. The forward and rearward bearings 34, 35 and 35' and the hubs 131 are mounted on the shaft 31 in the sequential arrangement previously described. A collar 40 is positioned against the rearward end of the rearwardmost of the bearings 35' and held in position by a pin 41. A sprocket wheel 140 is pinned to the shaft for unitary rotational movement therewith forwardly adjacent to the forwardmost of the forward bearings and a similar sprocket wheel 141 mounted concentrically on the hub 36.

A pair of forward arms 150a and 150b are individually mounted on the forward bearings 34 and outwardly laterally convergently extended therefrom. A bearing 151 is mounted on the outer ends of the forward arms in substantially parallel relation to the shaft 31. An axle 152 is rotatably mounted in the bearing 151 and held in axially fixed position therein by stop collars 153 mounted on the axles in fore and aft engagement with the bearing. The axle 152 provides a forward end which mounts a sprocket wheel 154 in the plane of the forward sprocket wheel 140. The hub 131 of a forward raking wheel 130 is pinned or splined to the axle 152 for unitary rotational movement therewith.

The rearward arms 60a and 60b are of the form previously described and mount their axle 61 in parallel relation to the shaft. A rearward raking wheel 130 has its hub 131 rotatably mounted on the axle 61. A sprocket wheel 160 is mounted on the hub of the rearward raking wheel in the plane of the rearward sprocket wheel 141. An endless chain 161 circumscribes the forward sprocket wheel 140 and the sprocket wheel 154. Similarly, a chain 161 circumscribes the rearward sprocket wheel 141 and the sprocket wheel 154. Other suitable drive linkages, such as V-belts and pulley wheels, will readily occur to those skilled in the art.

The raking wheels 130 are similar to the raking wheels 30 but employ only three spokes instead of six. Their leading and trailing segments 84 and 85 operate in the manner described but do not overlap in the manner shown in FIG. 2. Raking wheels of this type are found to have increased raking swath, as compared with conventional raking wheels of the same diameter, but each wheel tends to form swaths having notched margins.

It will be apparent that the second form of the invention could be constructed to dispose the raking wheels 130 obliquely to the line of travel so that they can be ground driven in the manner of the first form. In such event, the sprocket wheels 140, 141, 154, and 160 and the chains 161 interconnect the raking wheels for synchronous rotation. When this is done, the wheels should be synchronized in the manner shown in FIG. 5 so that when the forward and rearward wheels are raking a maximum swath the central raking wheel is raking its minimum swath and conversely when the central raking wheel is raking a maximum swath the forward and rearward raking wheels are raking their minimum swath. In such a manner, the notched swaths of the individual raking wheels can be so coordinated as to provide an aggregate swath of substantially greater width than attainable with conventional raking wheels. If raking wheels 30 are employed, no such synchronization is required.

However, when the raking wheels 130 are axially aligned with the direction of travel, they must be power driven. This is conveniently accomplished by providing the forward end portion of the shaft 131 with a universal coupling 171 connected to a power take-off 172 of the tractor 11. It is assumed that the power take-off rotates in such a direction as to drive the shaft 31 in a counterclockwise direction, as viewed in FIG. 5.

OPERATION OF SECOND FORM

The possibility of the ground driving the second form of the harvester by disposing the wheels 130 obliquely to the direction of travel has been alluded to and will not be reviewed. When the raking wheels are axially aligned with the direction of travel and the shaft 31 rotated so that the peripheries of the raking wheels in ground engagement travel to the right, as viewed, the forward raking wheel accumulates forage which is successively passed to the central and rearward raking wheels with forage accumulated by them and discharged into a single windrow, not shown. By axially aligning the wheels with the direction of travel and power driving them, raking wheels of a size attaining a swath of between 8 and 9 feet when employed in the first form of the harvester attain a swath of approximately 12 feet. However, because of the forward travel of the harvester during such raking action, the forage is traveled somewhat farther for each unit of switch width in reaching the windrow than when the raking wheels are obliquely disposed to the direction of travel.

When it is desired to convert the harvester from raking operations to tedding operation, the springs 74, if employed, are released, the pair of forward arms 150a and the pair of rearward arms 60a and 60b oppositely pivoted substantially 180° and the springs reconnected. As before, this involves the passage of the forwardmost rearward arm 60a through the periphery of the forward raking wheel which is readily accommodated by outwardly pivoting adjacent leading and trailing segments 84 and 85 thereof.

So positioned, the raking wheels 130 no longer feed successively from one to another but discharge encountered forage independently into individual windrows, not shown. As before, such smaller windrows dry more readily and can be rolled or unrolled by traveling longitudinally thereof with the raking wheels 130 passing along the windrows.

From the foregoing, it will be evident that the forage harvester of the present invention is substantially simplified as compared with conventional forage harvesters and has an actual increase in raking capacity. The forms illustrated and described weigh approximately one-third to one-half as much as conventional harvesters of comparable capacity. The mounting and transport mechanisms described are adapted to either power driving or ground driving of the raking wheels. In both instances, the harvesters are conveniently and easily adjusted for tedding and raking operations by the simple pivotal movement of mounting arm members for the forward and rearward raking wheels.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A forage harvester comprising:
   (a) an elongated shaft having opposite end portions,
   (b) means mounting the shaft in a substantially horizontal position for earth traversing movement in a direction such that the shaft has relatively forward and rearward end portions,
   (c) a raking wheel journaled on the shaft,
   (d) a pair of arm members independently pivotally mounted on the shaft and oppositely laterally extended therefrom, each providing an axle in substantially parallel relation to the shaft,
   (e) and raking wheels individually journaled on the axles and overlapping the raking wheel journaled on the shaft on opposite relatively forward and rearward sides thereof, each of the arm members including a pair of elongated rigid elements having inner ends spaced axially of the shaft and outwardly convergent outer ends rigidly mounting their axle.

2. The forage harvester of claim 1 in which the raking wheels are rotated in a common direction in forage engagement and in which the arm members are oppositely pivotal between oppositely laterally extended positions with the wheels in one positional relation rearwardly overlapping in their direction of rotation in forage engagement whereby the wheels convey forage successively from one to another into a common windrow for raking purposes and with the wheels in their other positional relation forwardly overlapping in their direction of rotation in forage engagement whereby the wheels independently discharge forage encountered thereby for tedding purposes.

3. The forage harvester of claim 2 having drive wheels individually mounted concentrically of each raking wheel for unitary rotational movement with their respective raking wheels, and endless flexible drive means circumscribing the drive wheels whereby the raking wheels are constrained to synchronous rotation.

4. The forage harvester of claim 2 having a sprocket wheel mounted concentrically of each raking wheel for unitary rotational movement with its respective raking wheel, and chain means circumscribing the sprocket wheels and interconnecting the raking wheels for corresponding rotational movement.

5. A forage harvester comprising:
   (a) an elongated shaft having opposite end portions,
   (b) means mounting the shaft in a substantially horizontal position for earth traversing movement in a direction such that the shaft has relatively forward and rearward end portions,
   (c) a raking wheel journaled on the shaft in adjacent spaced relation to the rearward end portion of the shaft,
   (d) a first pair of bearings journaled on the shaft in axially spaced relation forwardly of the raking wheel,
   (e) a first pair of arms individually connected to the first bearings and laterally convergently extended from the shaft,
   (f) a second pair of bearings journaled on the shaft, one thereof being forwardly of said raking wheel and the other being rearwardly thereof,
   (g) a second pair of arms individually connected to the second bearings and laterally extended from the shaft oppositely from the first arms,
   (h) a pair of axles individually mounted on the extended end portions of the first and second pairs of arms in substantially parallel relation to the shaft,
   (i) and raking wheels individually journaled to the axles and overlapping the raking wheel journaled on the shaft on opposite relatively forward and rearward sides thereof.

6. The forage harvester of claim 5 including a superstructure mounted on the frame between the pairs of arms and oppositely laterally extended from the shaft having opposite ends individually disposed above the respective pairs of arms, and resilient tension means interconnecting the opposite ends of the superstructure and their respective pairs of arms in supporting relation to the arms and their raking wheels.

7. A forage harvester comprising:
   (a) a first pair of axially spaced bearings,
   (b) a second pair of axially spaced bearings,
   (c) a first raking wheel having a hub disposed between the second pair of bearings,
   (d) means journaling the bearings and the hub in substantially horizontal axial alignment and mounting the same for earth traversing movement in a direction having a component axially of the bearings,
   (e) a first pair of arms individually mounted on the first bearings and laterally convergently extended therefrom,
   (f) a second pair of arms individually mounted on the second bearings and laterally convergently extended therefrom oppositely from the first arms,
   (g) a pair of axles individually mounted on the extended end portions of the first and second pairs of arms in substantially parallel relation to the bearings,
   (h) and a pair of second raking wheels individually mounted on the axles and overlapping opposite peripheral portions of the first raking wheel on opposite sides thereof.

8. A combined side delivery rake and tedder comprising:
   (a) an elongated shaft having opposite end portions,
   (b) means mounting the shaft in a substantially horizontal position for earth traversing movement in a direction such that the shaft has relatively forward and rearward end portions,
   (c) a raking wheel journaled on the shaft,
   (d) a pair of arm members independently pivotally mounted on the shaft and oppositely laterally extended therefrom, each providing an axle in substantially parallel relation to the shaft, the arm members being oppositely pivotal between positions substantially horizontally extended on opposite sides of the shaft,
   (e) and raking wheels individually journaled on the axles having separable peripheral segments and peripherally overlapping the wheel mounted on the shaft on opposite relatively forward and rearward sides, one of the arm members being in interfering relation to the wheel on the opposite member during pivotal movement of either arm member between its opposite positions and said peripheral segments of the wheel involved in such interference being separable to accommodate passage of the arm member in such interference.

9. A combined side delivery rake and tedder comprising:
   (a) an elongated shaft having opposite end portions,
   (b) means mounting the shaft in a substantially horizontal position for earth traversing movement in a direction such that the shaft has relatively forward and rearward end portions,
   (c) a raking wheel journaled on the shaft in adjacent spaced relation to the rearward end portion of the shaft,
   (d) a first pair of bearings journaled on the shaft in axially spaced relation forwardly of the raking wheel, (e) a first pair of arms individually connected to the first bearings and laterally convergently extended from the shaft, (f) a second pair of bearings journaled on the shaft, one thereof being forwardly of said raking wheel and the other being rearwardly thereof, (g) a second pair of arms individually connected to the second bearings and laterally extended from the shaft oppositely from the first arms, (h) a pair of axles individually mounted on the extended end portions of the first and second pairs of arms in substantially parallel relation to the shaft, (i) and raking wheels individually journaled on the axles having separable peripheral segments and peripherally overlapping the wheel mounted on the shaft on opposite relative forward and rearward sides, the pairs of arms being oppositely pivotal between positions substantially horizontally extended on opposite sides of the shaft whereby the raking wheels are alternately positionable between a first overlapping relation in which they successively convey forage into a common windrow for raking purposes and a second overlapping relation in which they independently discharge forage for tedding purposes, one of the pairs of arms being in interfering relation to the wheel on the opposite pair of arms when either pair of arms is pivoted to its opposite position and said peripheral segments of the wheel involved in such interference being separable for the passage of the pair of arms in such interference therethrough.

10. A combined side delivery rake and tedder for forage crops comprising:
(a) a first pair of axially spaced bearings,
(b) a second pair of axially spaced bearings,
(c) a first raking wheel having a hub disposed between the second pair of bearings,
(d) means journaling the bearings and the hub in substantially horizontal axial alignment and mounting the same for earth traversing movement in a direction having a component axially of the bearings,
(e) a first pair of arms individually mounted on the first bearings and laterally convergently extended therefrom,
(f) a second pair of arms individually mounted on the second bearings and laterally convergently extended therefrom oppositely from the first arms,
(g) a pair of axles individually mounted on the extended end portions of the first and second pairs of arms in substantially parallel relation to the bearings, the pairs of arms being oppositely pivotal between positions substantially horizontally extended on opposite sides of the bearings,
(h) and second raking wheels individually journaled on the axles having separable peripheral segments and peripherally overlapping the first wheel on opposite relative forward and rearward sides, one of the pairs of arms being in interfering relation to the wheel on the opposite pair of arms during pivotal movement of either pair of arms between its opposite positions and said peripheral segments of the wheel interfered with being separable to accommodate passage therethrough of the interfering pair of arms.

11. A forage harvester comprising:
(a) a plurality of peripherally overlapping raking wheels disposed in substantially parallel erect planes, there being a forward wheel, a central wheel and a rearward wheel;
(b) means mounting the central raking wheel for rolling earth traversing movement oblique to its plane;
(c) means for rotating the central raking wheel during earth traversing movement;
(d) arm members mounted for elevational pivotal movement concentrically of the central raking wheel, oppositely laterally extended from the axis thereof and individually mounting the forward and rearward raking wheels for independent elevational movement in their respective planes;
(e) drive wheels individually mounted concentrically of each raking wheel for unitary rotational movement with their respective raking wheels;
(f) and endless flexible drive means circumscribing the drive wheels whereby the raking wheels are constrained to synchronous rotation.

12. A forage harvester comprising:
(a) a plurality of peripherally overlapping raking wheels disposed in substantially parallel erect planes, there being a forward wheel, a central wheel and a rearward wheel;
(b) means mounting the central raking wheel for rolling earth traversing movement oblique to its plane;
(c) means for rotating the central raking wheel during earth traversing movement;
(d) arm members mounted for elevational pivotal movement concentrically of the central raking wheel, oppositely laterally extended from the axis thereof and individually mounting the forward and rearward raking wheels for independent elevational movement in their respective planes;
(e) a pair of drive wheels mounted for unitary rotational movement concentrically with the central raking wheel;
(f) drive wheels individual to the forward and rearward raking wheels and mounted for unitary rotational movement with their respective raking wheels and being individually disposed in planes with the drive wheels of the central raking wheel;
(g) and endless flexible drive elements circumscribing the drive wheels disposed in common planes whereby the raking wheels are rotated in synchronous relation.

13. A forage harvester comprising:
(a) an elongated substantially straight shaft having opposite end portions,
(b) means mounting the shaft in a substantially horizontal position for earth traversing movement in a direction such that the shafts has relatively forward and rearward end portions the shaft being axially slidable in said mounting means,
(c) a raking wheel journaled on the shaft,
(d) a pair of arm members independently pivotally mounted concentrically on the shaft and oppositely laterally extended therefrom, each providing an axle in substantially parallel relation to the shaft,
(e) raking wheels individually journaled on the axles and overlapping the raking wheel journaled on the shaft on opposite relatively forward and rearward sides thereof,
(f) and stop means mounted on opposite end portions of the shaft to hold the shaft in the mounting means and the raking wheel and arm members in assembled relation on the shaft, at least one of said stop means being releasable to free the shaft for axial slidable movement from the mounting means, the raking wheel mounted thereon and the arm members to disassemble the harvester.

14. A forage harvester comprising:
(a) an elongated substantially straight shaft having opposite end portions,
(b) means mounting the shaft in a substantially horizontal position for earth traversing movement in a direction oblique thereto such that the shaft has relatively forward and rearward end portions, the shaft being axially slidable in said mounting means,
(c) a pair of arm members independently pivotally journaled on the shaft for slidable movement axially relative thereto and each providing an axle in substantially parallel relation to the shaft,
(d) raking wheels individually journaled on the axles of the arm members, said arm members being independently pivotal selectively to dispose their respective raking wheels forwardly and rearwardly of the shaft, (e) and stop means mounted on opposite end portions of the shaft to hold the shaft in the mounting means and the arm members thereon, at least one of said stop means being releasable to free the shaft for axial slidable movement from the mounting means and the arm members to disassemble the same.

References Cited by the Examiner

UNITED STATES PATENTS

| 2,657,519 | 11/1953 | Hill | 56—377 |
| 2,816,414 | 12/1957 | Van der Lely et al. | 56—377 |
| 2,851,845 | 9/1958 | Van der Lely et al. | 56—366 |
| 3,098,341 | 7/1963 | Worrel | 56—377 |

ABRAHAM G. STONE, *Primary Examiner.*
RUSSELL R. KINSEY, *Examiner.*